United States Patent [19]

Albano et al.

[11] Patent Number: 4,646,324
[45] Date of Patent: Feb. 24, 1987

[54] DIGITAL INFORMATION TRANSFER SYSTEM (DITS) TRANSMITTER

[75] Inventors: Rocco V. Albano, Granby; Ronald G. Durej, Windsor, both of Conn.

[73] Assignee: United Technologies Corporation, Hartford, Conn.

[21] Appl. No.: 700,434

[22] Filed: Feb. 11, 1985

[51] Int. Cl.[4] .............................................. H04K 1/10
[52] U.S. Cl. .................................... 375/38; 370/18; 364/514
[58] Field of Search ................ 375/38, 40, 59, 10; 370/13, 18, 53, 54, 55, 58, 61, 67, 84; 364/514

[56] References Cited

U.S. PATENT DOCUMENTS

| | | | |
|---|---|---|---|
| 3,665,405 | 5/1972 | Sanders et al. | 370/55 |
| 3,937,935 | 2/1976 | Le Pabic | 370/13 |
| 4,006,457 | 2/1977 | Hepworth et al. | 370/18 |
| 4,298,959 | 11/1981 | Sundermeyer et al. | 364/900 |
| 4,392,221 | 7/1983 | Hesketh | 370/54 |
| 4,542,380 | 9/1985 | Beckner et al. | 370/61 |

OTHER PUBLICATIONS

P. Horowitz and W. Hill, The Art of Electronics, (Cambridge University Press; 1980) pp. 468-469.
Real Time Computing: with Applications to Data Acquisition and Control, edited by D. A. Mellichamp (Van Nostrand Reinhold; 1983).

Primary Examiner—Robert L. Griffin
Assistant Examiner—Stephen Chin
Attorney, Agent, or Firm—Robert P. Sabath

[57] ABSTRACT

A digital transmitter (13) for transmitting serial words of predetermined length at selected speeds for output at a plurality of parallel channels (120, 120'). The words selected for series transmission at said parallel output channels (120, 120') are sequentially repeatedly applied to a multiplexer (89) which forwards selected bits from these words at fixed and variably setable speeds to a selected shift register (101 or 102) and latch (105 or 106), combination for output transmission.

1 Claim, 12 Drawing Figures

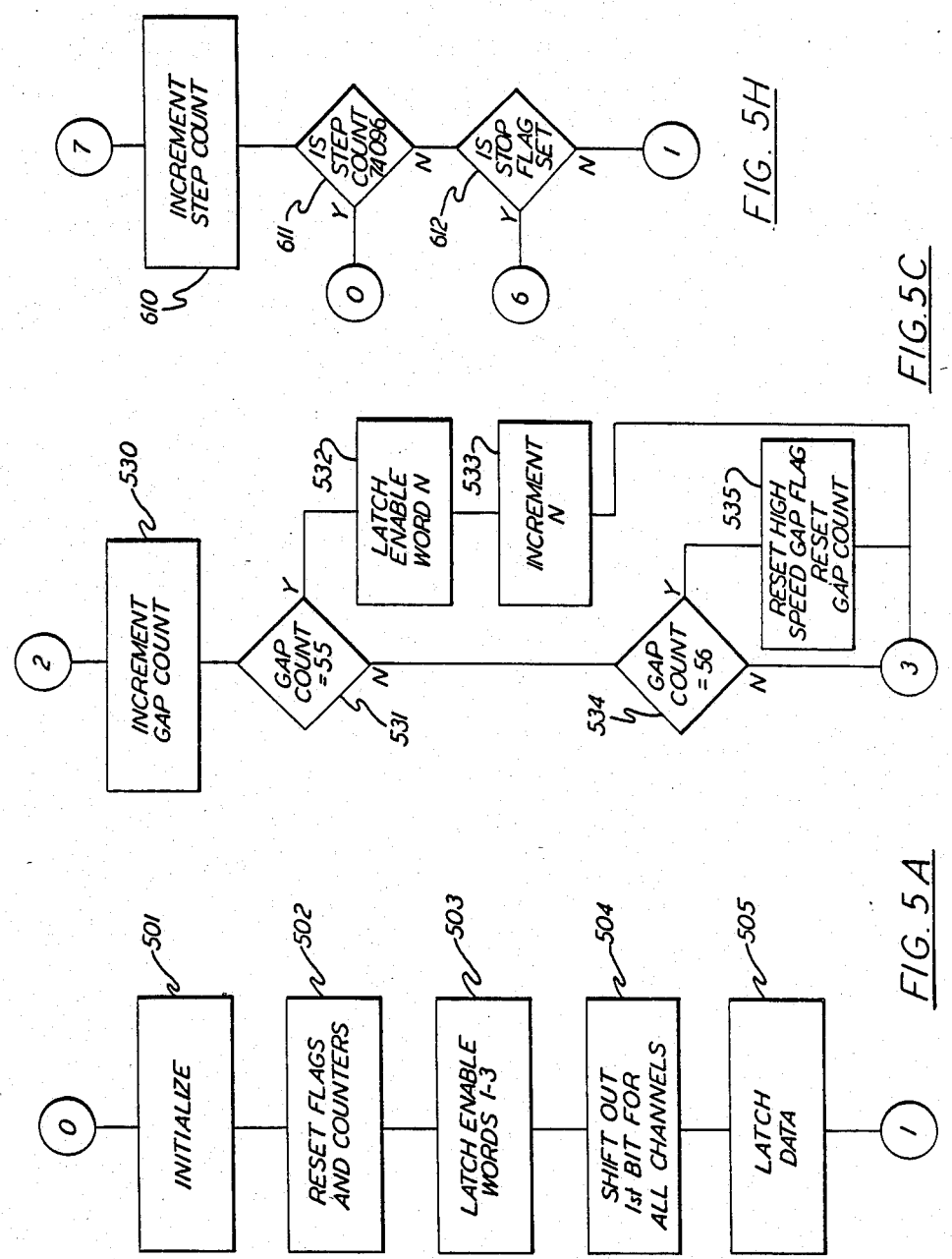

DIGITAL INFORMATION TRANSFER SYSTEM (DITS) TRANSMITTER

TECHNICAL FIELD

This invention relates to the serial production of digital words of information from an established database at parallel output channels, preferably in ARINC 429 format.

BACKGROUND ART

Complex electronic systems such as airborne integrated data systems (AIDS) have assisted the operation and piloting of aircraft and airborne vehicles for some time. One example of such an AIDS system is the A310 data management unit (DMU), which has been employed effectively in many aircraft systems. The A310 DMU monitors aircraft vehicle performance and operating conditions repeatedly during flight. The A310 aircraft includes smart sensors and computer systems which gather information regarding a variety of flight parameters. The information acquired is sent to a digital information transfer system (DITS) receiver along a predetermined number of parallel channels, as described in U.S. Pat. No. 4,298,959 entitled DIGITAL INFORMATION TRANSFER SYSTEM (DITS) RECEIVER, granted to Frank D. Sundermeyer et al. and assigned to United Technologies Corporation. This patent is expressly referred to and incorporated herein by reference.

This patent describes the receipt of serial data in ARINC 429 format in parallel through several channels, some of them operating at low speed and others selectably operating at high speed. In order to test the performance of A310 DMU's during manufacturing, without actually conducting flight operations, a data base has been established to simulate the flight parameters to be presented to the DITS receiver.

To provide the DITS receiver with information from this data base, a digital transmitter is required which can produce serial words of information received in parallel from the data base serially at a plurality of parallel output channels at various signal speeds and according to ARINC 429 format. It is a further object of the invention to design a digital transmitter minimizing hardware costs and design complexity.

DISCLOSURE OF INVENTION

According to the invention, a digital transmitter converts parallel words of information into serial words for output at a plurality of parallel output channels. Instead of using a conventional and costly bank of latches and shift registers or a plurality of USART devices to accomplish this parallel-to-serial conversion, a control sequence in PROM conducts clocking, loading and latching with respect to the parallel-to-serial conversion.

In such an arrangement, the control lines are simply outputs of the control function in PROM. The parallel-to-serial function is moreover incorporated into the control sequence, thereby eliminating the need for a large amount of shifting and latching hardware. Individual bits of information from each word to be transmitted are shifted into a single register until a bit per channel has been acquired and latched into place to drive respective ones of said parallel channel output lines. The bits are held latched onto the output channel lines, while the next bits for output are shifted into the register preceding the latch. The controller continues this process until a complete serial word has been output on each selected channel.

According to one version of the invention, both high and low speed output channels are driven by the latching device of this arrangement.

According to yet another version of the invention, the controller interleaves read and load cycles with respect to an internal memory of the arrangement.

BRIEF DESCRIPTION OF DRAWING

The invention is best understood by reference to the drawing which is in several figures, wherein:

FIGS. 5A-5H show a flowchart indicating operation of the digital controller.

BEST MODE FOR CARRYING OUT THE INVENTION

Figure 1:
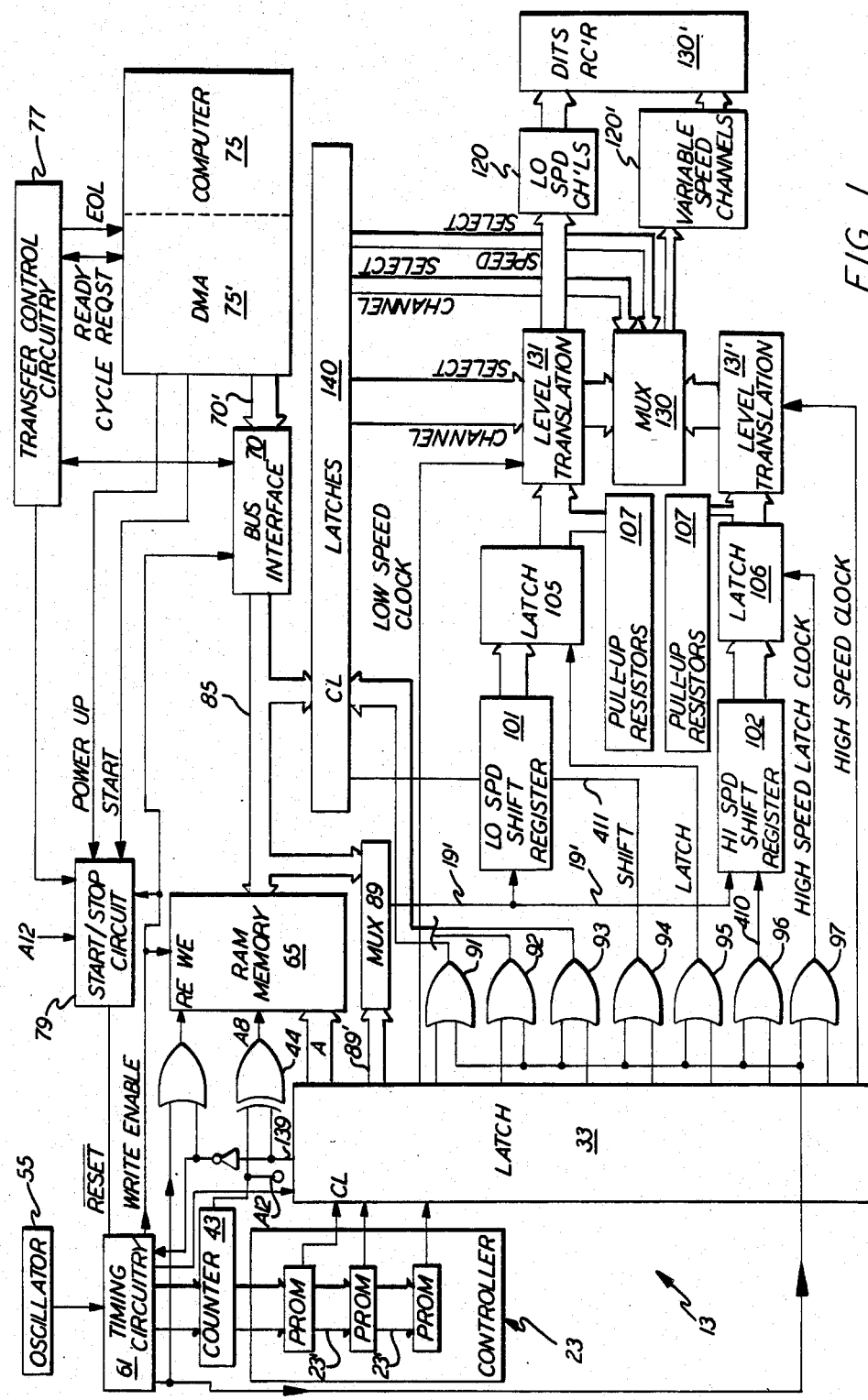
FIG. 1 is an overall block diagram of the digital transmitter according to the invention herein.

FIG. 1 shows a digital transmitter 13 according to the invention herein, including a digital controller 23 having an output latch 33, and subject to sequencing by a counter 43 in turn driven by an oscillator 55 acting through timing circuitry 61, which in turn provides write enable (WE) and read enable (RE) signals to a memory 65.

The transmitter 13 additionally includes an interface 70 such as for example a FIFO buffer for receiving information from a data base contained in a computer 75 featuring direct memory access (DMA) hardware to interface the data with bus interface 70. Transfer control circuitry 77 assists in the tranfer of data from computer 75 to interface 70. The computer 75 also provides initialization, power-up and start signals to start/stop circuitry 79 effective for generating a reset signal provided to timing circuitry 61. Computer 75 is for example a Digital Equipment Corporation PDP 11/34 computer.

FIG. 1 additionally shows a multiplexer (MUX) 89 for receiving data from a bus 85 connecting interface 70, memory 65, multiplexer 89, and latches 140 as will be seen. MUX 89 provides the data from bus 85 serially to low speed and high speed shift registers respectively 101 and 102. The data on bus 85 is applied to MUX 89 from memory 65 under direction from controller 23, as will be seen.

The data in high and low speed shift registers 101 and 102 is applied to corresponding latches 105 and 106 under direction of controller 23. Level translators 131 and 131' effect a level translation into ARINC 429 format of the data from latches 105 and 106 for presentation of the data on bipolar output channels 120 and 120' for transmission to DITS receiver 130.

A preferred or best mode of this invention is directed toward a digital transmitter providing data along 36 output bipolar ARINC 429 channels 120 and 120'. According to one version of the invention, eight of these channels can be selectably set to operate in high speed or low speed modes. Multiplexer 89 outputs data according to either one of the selected modes. Enable latches 140 provide enable words from bus 85 to select the on/off status of each of the 36 output channels as well as the high or low speed status of eight of the total number of channels according to this version of the invention.

Computer 75 is connected to interface 70 which effectively receives information in parallel from computer 75. Interface 70 preferably includes a pair of AMD AM2812ADL chips which are used as a dual-port buffer connected to DMA 75'. Interface 70 is preferably a FIFO buffer of this kind, because as a two-port device it does not require complicated interaction between output bus 70' from computer 75, and bus 85 between memory 65 and interface 70.

For more information regarding DMA techniques and devices, see pp. 468-469 in P. Horowitz and W. Hill, THE ART OF ELECTRONICS (Cambridge University Press; 1980). Simply stated, direct memory access is unprogrammed communication directly between a peripheral and memory unit effectively bypassing involvement of an arithmetic or accumulator unit, whether or not the communication is actually handled by the CPU hardware or not. This permits data to be moved very rapidly to and from a device. No interrupt handling is required and CPU overhead is minimized. The CPU does not need to be programmed to implement DMA transactions, but CPU program execution is somewhat slowed, because DMA activity employs bus cycles that would otherwise be used to access memory for program execution. When the DMA hardware requests bus access of special bus lines designed for that purpose, the CPU grants permission. The peripheral then asserts memory addresses onto the bus and either sends or receives data, one location at a time, depending on the direction of transfer as specified by the peripheral on another bus control line. Data transfer is synchronized by control signals generated by both CPU and peripheral, in accordance with well-known "handshaking" techniques. See also REAL TIME COMPUTING: WITH APPLICATIONS TO DATA ACQUISITION AND CONTROL, edited by D. A. Mellichamp (Van Nostrand Reinhold; 1983).

Interface 70 is for example 32 words deep and 16bits wide. In other words, in loading one block portion of data or 210 16-bit words into memory 65, word-by-word along bus 85, the output side of interface 70 is repeatedly depleted by one 16-bit word and then replenished by another 16-bit word at its input. This permits temporary holding of words produced by computer 75 and orderly application thereof onto internal bus 85.

Figure 2:
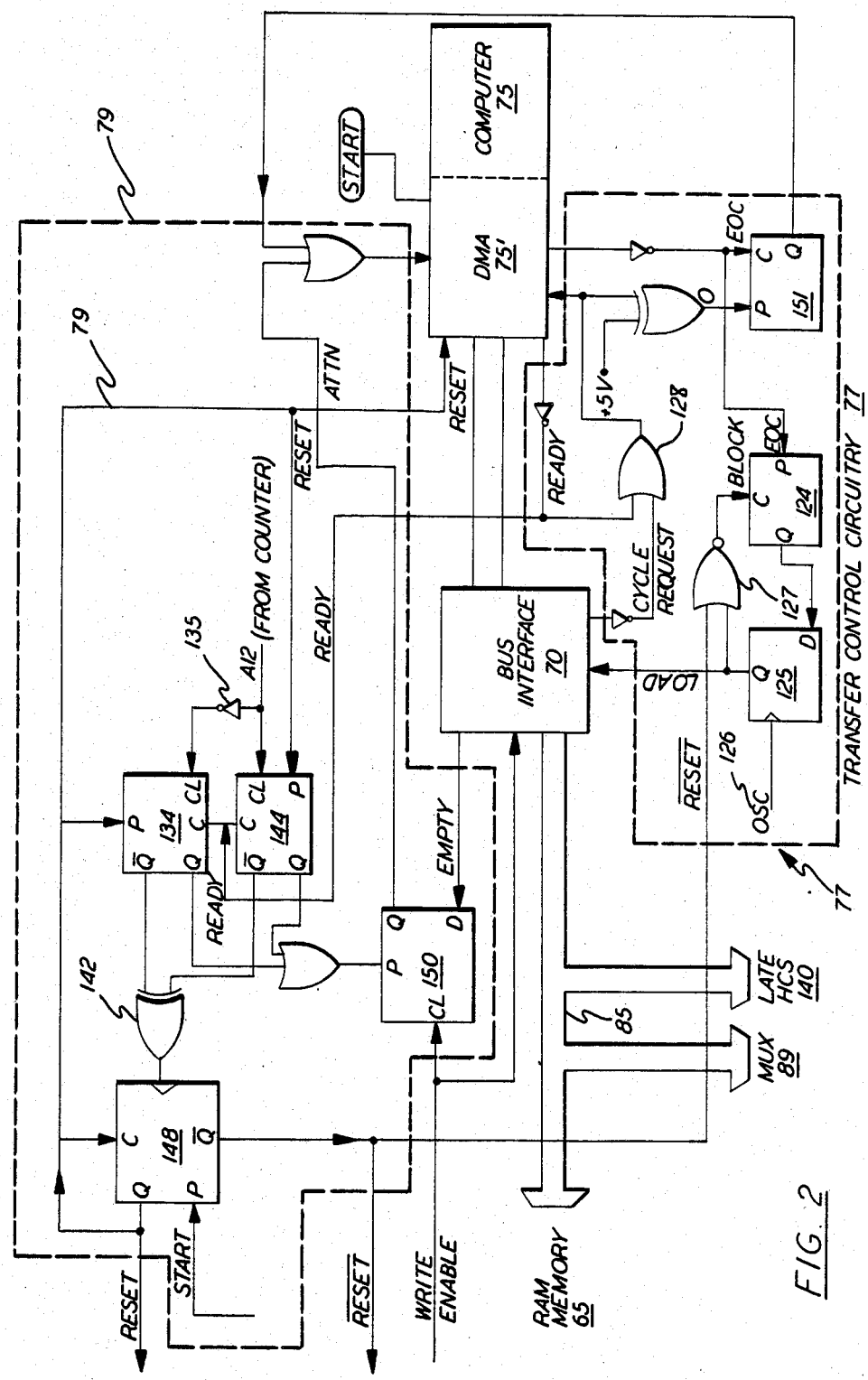
FIG. 2 is a partial block diagram of the digital transmitter showing additional detail, in particular with respect to the transfer control circuitry enabling the transfer of words of information from the main data base into a bus interface.

Interface 70 is controlled by transfer control circuitry 77 which receives an end of cycle (EOC) pulse from DMA 75' indicating that another 16-bit word of data is available from the DMA 75'. As shown in FIG. 2, the EOC pulse clears flip-flop 151 and presets type-D flip-flop 124. Presetting flip-flop 124 causes flip-flop 125 to change state, thereby sending a load pulse to interface 70. Flip-flop 124 thus in effect catches the EOC pulse from DMA 75'. Oscillator 126 drives flip-flop 125 with a clock of sufficient width needed to establish the load pulse to bus interface 70. Flip-flop 124 is cleared through NOR gate 127 after each load pulse is sent to interface 70 and in response to a reset (RESET) signal as will be discussed below.

If interface 70 is not yet full, an output pulse is delivered to NOR gate 128 to produce a cycle request signal for DMA 75' causing it to go through another word cycle and pulling out another word from computer 75 for transmittal to bus interface 70.

Interface 70 is connected to parallel bus 85 which is in turn connected to memory 65 including preferably a pair of RAM memory chips. The combined memory 65 holds at least two separate blocks of information in alternating regions thereof. Each DMA transfer message includes one or more blocks of 210 16-bit parallel words from computer 75. It takes several block cycles to load an entire such message of information from computer 75, because memory 65 can hold for reading only two-hundred-and-ten 16-bit words from computer 75, which is equivalent as will be seen to one-hundred ARINC 429 serial words output from the digital transmitter 13 discussed herein.

In particular, this block includes thirty-six output low-speed ARINC words and sixty-four output high-speed ARINC words as well as ten enable words for use in latches 140. The thirty-six low-speed output words are produced in thirty-six parallel low-speed output channels; and the sixty-four high-speed output words are concurrently produced on eight high-speed output channels. As noted, several block-cycles may be required for transmission of a single message of information.

The RAM chips in memory 65 are preferably Mostek MK4801 static RAMs. However, any commercially available 1K-by-8 static RAM chip can be substituted therefore in order to implement a preferred version of the invention. Each such RAM has eight data-lines, and two such RAMs connected in parallel are able to accommodate a 16-bit data bus 85 according to the invention.

Data from bus 85 is written into a first or second region of memory 65. These respective regions flip-flop from cycle-to-cycle to implement continuous and contemporaneous receive and transmit functions with respect to memory 65.

In loading or write operation, a first 16-bit word from bus 85 is written into an predetermined receive portion of memory 65, according to an address location established by controller 23.

As shown in FIG. 1, when the last bit of counter 43 changes state, exclusive OR gate 44, acting as a programmable inverter, changes the state of address line A8 with every cycle of 210 words from computer 75. Thus, the two regions of memory 65 can be employed for alternating read and write and are flip-flopped for the next cycle of 210 words.

A 210 word-cycle in the case of a preferred embodiment of the invention includes 4096 steps of operation for controller 23, which in turn includes a plurality of read and write steps according to the scheme of controller sequencing which will be discussed below. The object of each cycle is to load one block of 210 16-bit words, word by word, into one region of RAM and to interspersedly transmit previously loaded information from the complementary memory region in RAM.

During the first 4096 step cycle of transmitter operation, 210 input words are written into a selected first region of memory 65. During a next cycle of operation, it is desired to read out of the same selected first region and to write into the complementary region of RAM.

This is implemented under control of an exclusive OR gate 44 which, as has been noted, flip-flops the alternating regions of RAM memory 65. In particular, if the controller activity after counter 43 is toggled high is a write activity, then the first region of memory 65 is subject to writing activity. If, on the other hand, the controller produces a read action upon the contents of the address specified, then the second region is subject to reading. Similarly, if the toggle output is low and write is planned, then a first particular region of memory is subject to the writing. If, on the other hand, the toggle output is low and read high is to occur, then reading will occur from the first region. Counter 43 output toggles every 4096 steps.

Location OOH in memory 65 is allocated to hold the first word of low-speed information from computer 75. This information is ultimately scheduled to be produced serially on channel one at the output of transmitter 13. Since each ARINC 429 word is thirty-two bits long, the next RAM location, 01H, contains the final sixteen bits of this first low-speed word. Similarly, location 02H holds the first sixteen-bits of the first low-speed word of information to be output along channel-two.

This scheme is followed to determine the locations of all low speed words in RAM memory 65. Accordingly, the second-to-last RAM location for a low speed word, which is destined for output along channel thirty six; and the final RAM location allocated to low-speed information, is 47H, which contains the last sixteen-bits of the last low-speed information channel, that is channel thirty-six.

For high speed data, the arrangement of information in memory 65 is similar. The first sixteen-bits of the first high-speed word to be output through high-speed channel-one are allocated to RAM location 48H; and the last sixteen-bits of the eighth high-speed word are allocated to RAM location C7H for output along high-speed channel-eight, there being only eight channels of high speed data, according to a preferred version of the invention, whereas there are thirty-six channels assigned to transmit low-speed information. To feed the eight high-speed output-channels from memory 65, it follows that 128 RAM memory locations are required for the storage of high speed words. Similarly, the thirty-six low speed channels are necessarily provided with information from corresponding seventy-two RAM memory locations.

Other RAM memory locations are allocated to provide temporary storage for a series of sixteen-bit enable words. In this embodiment of the invention, the enable words are assigned memory locations C8H through D1H. These memory locations accordingly hold respective enable words one through ten.

To transmit an ARINC 429 word, controller 23 requires that an entire word of information for each output channel be available in memory 65 before any output transmission is conducted. Accordingly, the controller 23 loads memory 65 with data from DMA 75'.

Since memory 65 has alternating output regions, long gaps in the output data stream are avoided even during loading periods for the RAM. While loading takes place in a first region of memory 65, data is transmitted from a complementary region of memory 65. Preferably, one-half of the RAM is dedicated to loading information and the other half is dedicated to transmitting information. After completion of each 4096-step transmission cycle, the respective roles of the two memory regions flip-flop, with the former memory transmission region now effective to receive information, and vice-versa.

After a first block of information has been stored in memory 65 for transmission, the control sequence established in controller 23 can undertake the conversion of this information from parallel to serial form for output on respective channels 120 and 120'. The controller 23 directs operations as indicated in the flowcharts of FIGS. 5A-5H described below.

A sixteen-to-one multiplexer 89 is connected to bus 85 to support parallel-to-series conversion under the guidances of controller 23 including three UV erasable PROMs. The PROMs are programmed such that their respective outputs are effective for providing a predetermined sequence of RAM address and control line signals. Multiple functions can be executed, since the output control lines of controller 23 are independently assertable. Furthermore, by employing UV EPROMS, desired changes can easily be implemented merely by erasing a selected one or more of the chips and establishing a new state sequence thereupon.

The PROMs act in conjunction with corresponding output latches 33 to determine the selection of bits by multiplexer 89 for serial output. This is done along the four address or select lines 89' to multiplexer 89.

Figure 3:
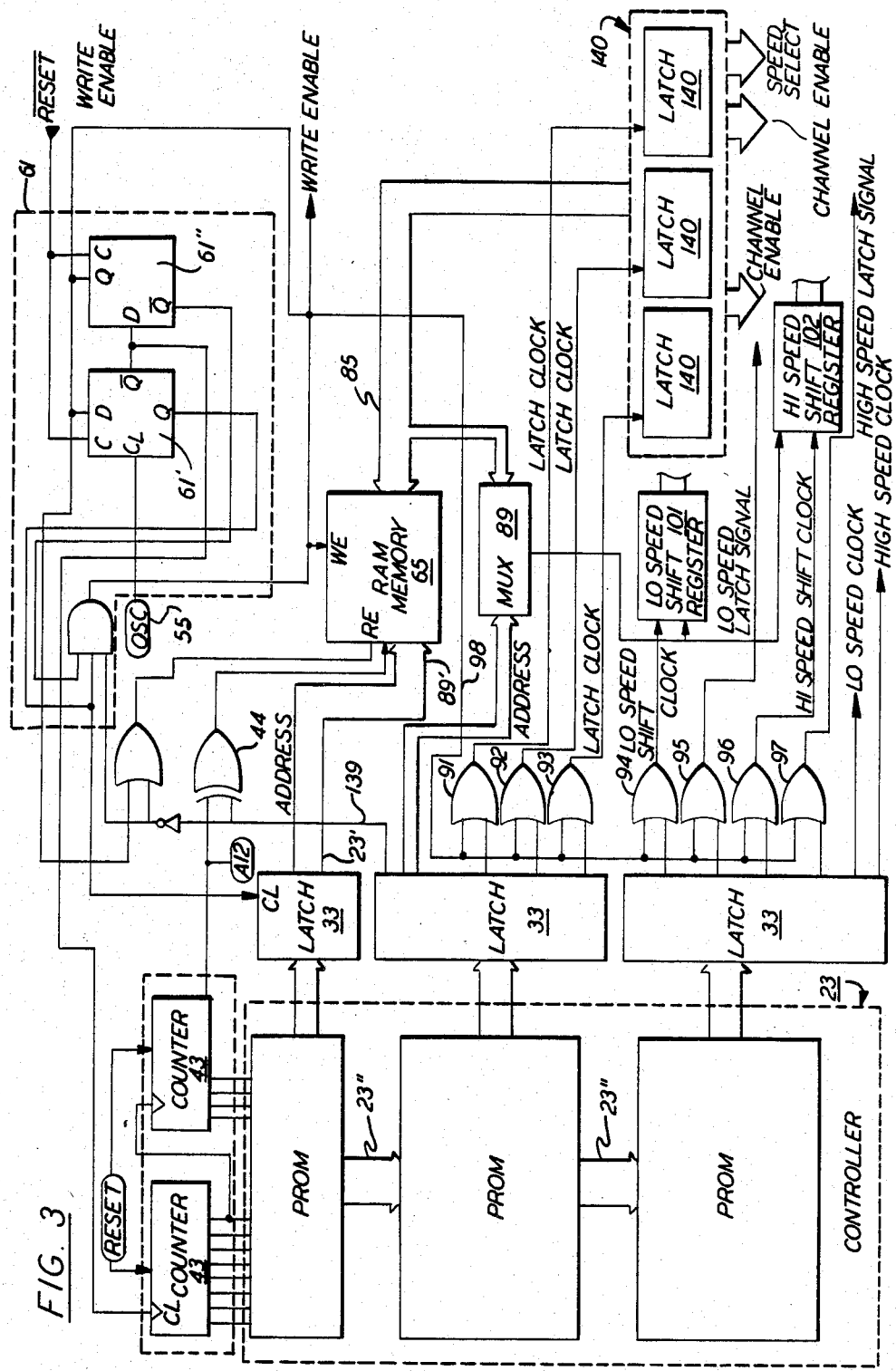
FIG. 3 is a partial block diagram of the digital transmitter detailing the timing and control circuitry.

One output bit line 139 from controller 23 (as best seen in FIG. 3) controls the write enable (WE) line and influences exercise of a write pulse with respect to memory 65, permitting the entry of a word of information into memory 65 from interface 70.

The address lines 23' of controller 23 are derived from counter 43, which comprises a pair of 8-bit counter-chips which pass through 4096-steps, constituting a single cycle. The PROMs comprising controller 23 are interconnected by common address lines 23", effectively coordinating their sequential action. Selected outputs of controller 23 are shown directing the addressing of particular locations in memory 65.

Additionally, there is shown a 5.6 megahertz oscillator 55 effective for driving timing circuitry 61, which in turn controls the cycling of words from computer 75 into bus interface 70 and then onto bus 85.

Timing circuitry 61 as seen in FIG. 3 includes flip-flops 61' and 61" that are connected to establish a "divide by four" basic clock frequency for counter 43 of 1.4 megahertz.

FIG. 2 additionally shows start/stop circuitry 79 in detail. When counter 43 has completed all 4096 steps in its transmission cycle for 210 words of computer 75 data, flip-flops 134 and 144 receive clock pulse A12 from counter 43 with DMA 75' providing a ready signal (READY) to flip flops 134 and 144, if the DMA 75' is in fact ready to allow interrupts and to produce a RESET signal to indicate end of current message and readiness for another message cycle. This READY signal ends the application of a clear condition on the two flip-flops 134 and 144. Inverter 135 provides a leading edge pulse to one of flip-flops 134 and 144 and a rising edge pulse to the other of the two flip-flops causing the output of one of the flip-flops to delay following the other by one cycle, thus permitting the last 210 words in memory 65 to be transmitted. Accordingly, flip-flop 148 is only clocked when both of the inputs to exclusive NOR gate 147 are set low. The outputs to the two flip-flops 134 and 144 are connected to an exlusive NOR gate 147 in turn causing flip-flop 148 to produce output RESET and RESET signals. In summary, a reset signal is established in response to a READY signal in conjunction with counter 43 reaching the end of a cycle of 4096 steps. This causes operation to end as to a particular block of information from computer 75.

Flip-flop 150 interrupts operation on computer 75 with an ATTN signal to shut down operation, if interface 70 indicates that interface 70 is empty and has no data for application onto bus 85. The preset on flip-flop 150, however, prevents the generation of such an interrupt signal during the period of time when the outputs of flip-flops 134 and 144 are different, i.e., during clearance of a final 210 words from memory 65. Furthermore, flip-flop 151 prevents the application of interrupt ATTN to the DMA 75' during performance of an active bus transfer cycle. However, at the end of a bus cycle during which data is transmitted to the interface 70 from DMA 75', an interrupt signal is acceptable, if DMA 75' is ready to cycle out more data.

Controller 23 governs operation in part through OR gates 91 through 97 in FIG. 3, subject to input line 98 from timing circuitry 61 and latches 140 effective for producing output control signals leading to low and high speed shift registers 101 and 102 shown in FIG. 1. These shift registers 101 and 102 hold bits of information to be transmitted along respective low and high speed channels 120 and 120', as will be shown.

Figure 4:
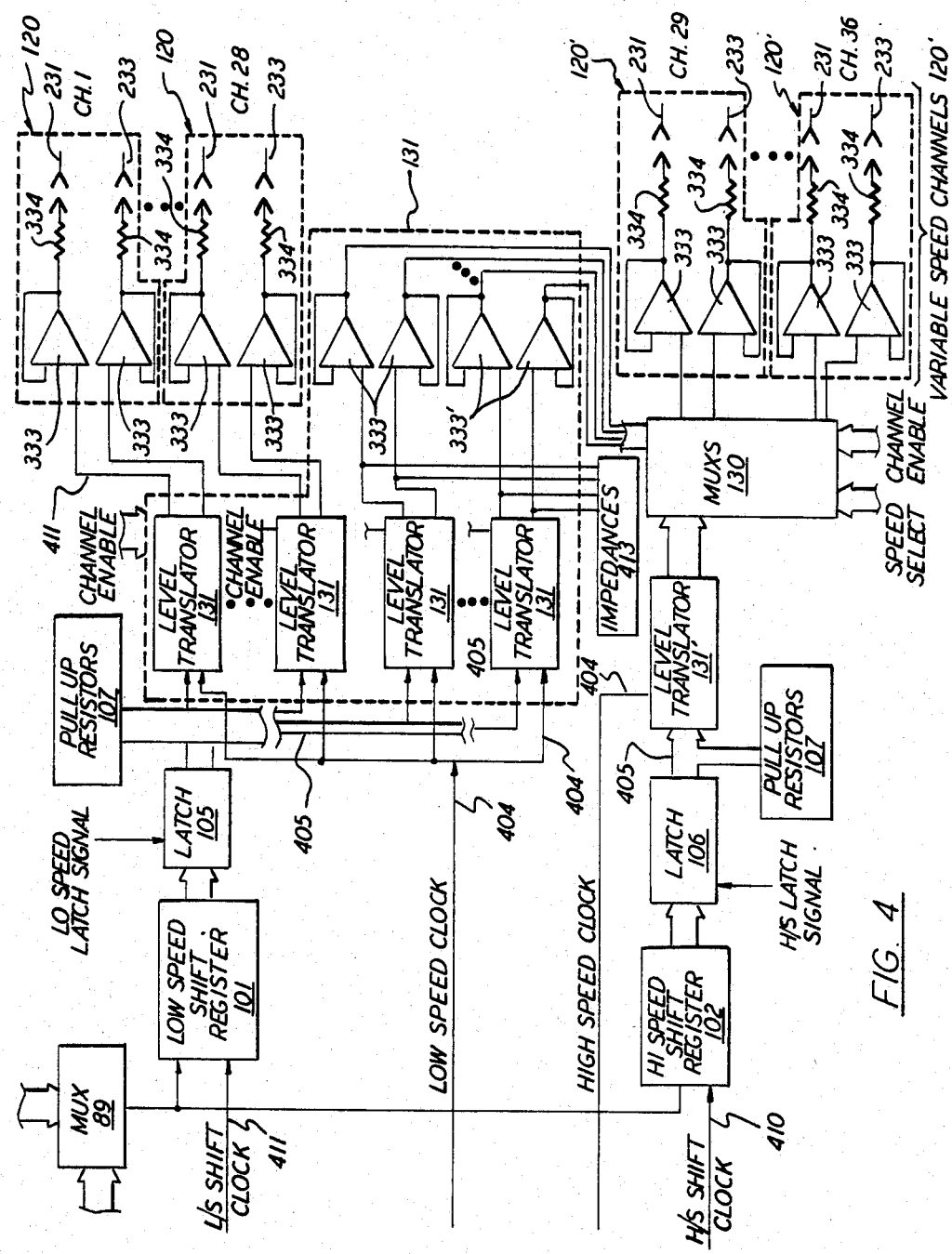
FIG. 4 is a block diagram of the output portion of the transmitter.

FIG. 4 shows low-speed shift register 101, which according to a preferred embodiment is distributed over three separate chips. Data from low-speed shift register 101 is forwarded to low-speed latch 105 similarly distributed over three corresponding chips which in turn respectively cooperate with the corresponding chips of shift register 101. These latches 105 in turn are connected to pull-up resistor bank 107 to provide the proper pull-up voltages for a bank of eighteen multiplexers 131 according to a preferred embodiment of the invention, acting as level shifters to translate TTL format into the desired ARINC 429 three-level format involving output signals at levels of plus or minus five volts or zero.

Shift register 101 is preferably made of three 54LS164 chips. Each such chip has eight output lines leading to a corresponding latch chip in latch 105, which in turn also has eight output lines. Each of these output lines drives a single output line 120 of digital transmitter 13. Only two output lines from the last shift register chip 101 are needed for this preferred embodiment. Since 36 low-speed output channels are contemplated according to a preferred version of the invention, six 54LS164 chips are employed for low speed purposes, four of them driving eight output channels each (for a total of 32 output channels) and two of them driving a total of two output channels each, for a grand total of 36 output channels 120 and 120'.

In operation, the several chips of shift register 101 are filled with data bits in succession, and the overload from one chip enters a next connected chip of the shift register 96, until each of the chips has been accessed and is sufficiently loaded to account for transmission on each selected output channel 120.

FIG. 1 further shows high speed shift register 102 connected to a corresponding high speed latch 106 and pull-up resistor bank 107. From high speed latch 106, data travels to level translater 131' and multiplexer 130 to selectable high or low speed channels 120'.

As FIG. 4 shows, multiplexers 130 can be selected for high or low speed operation of channels 29 through 36. High speed data can pass directly through multiplexer 130 to drive amplifiers 333 and resistors 334 of channels 120'. However, low-speed data passing to multiplexer 130 from low-speed level translator 131 first passes through parallel amplifiers 333' to provide the needed ARINC 429 slew rate limit.

Each of level shifters 131 or 131' drives a single differential output channel 120 or 120', each in turn including a pair of leads 231 and 233 connected to the DITS receiver 130' described in the aforementioned patent. Each of level shifters 131 has at its output two driver amplifiers 333, each in turn followed by a resistor 334 in accordance with ARINC 429 requirements.

Each level translator 131 and 131' is subject to clock and data and enable inputs, respectively 404 and 405, and produces a zero output when the clock inputs are zero, a minus five volt output when the clock input is on and the data input is low and a positive five volt output when the clock input is high and the data input is high, thus effectively enabling and disabling respective ones of output driver amplifiers 333. The output lines 411 from level translators 131 are pulled up by impedances 413. The output of the translator will be zero if the channel is not enabled.

Figure 5B:
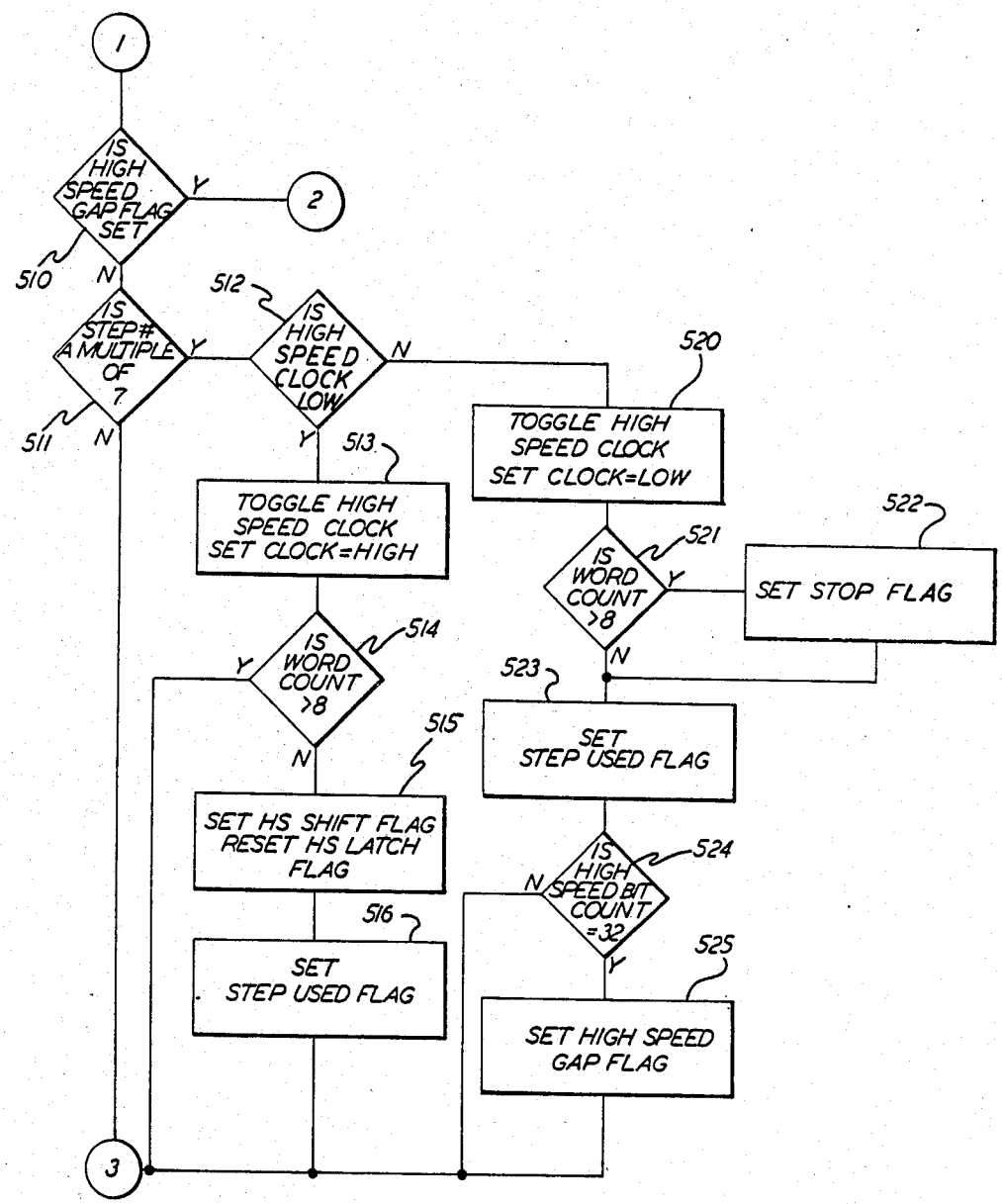

As indicated in the operational flowcharts of FIGS. 5A-5H, controller 23 directs operation as follows. First, as seen in FIG. 5A, a number of initialization steps are performed as suggested by block 501. These steps include the initialization of all pertinent variables. Furthermore, all necessary flags and counters are reset as indicated by block 502.

Next, the first three sixteen-bit enable words are applied to respective output latches 140 as suggested by block 503 in FIG. 5A. These words effectively control which of the thirty-six output channels are operable and which are not and high/low speed selection. Selected bits in the enable words correspond with particular ones of the output channels 120 and 120'.

Once the various channels have been selected for operability or nonoperability in accordance with the scheme established by the appropriate ones of the enable words, the first information bit associated with each of the various output channels 120 and 120' is shifted out of its pre-established memory location in memory 65 and onto the bus 85. The first output bits are then transferred along bit line 19' to shift register 101 or 102 and corresponding latches 105 or 106 associated with respective channels 120 and/or 120' at which the particular information bits are destined for output, as suggested at blocks 504 and 505 of FIG. 5A.

As seen in FIG. 4, there are two shift registers 101 and 102. The low-speed register 101 is thirty-six bits wide and is associated with the low speed-channels 120 and variable speed channels 120'. High speed register 102, on the other hand, is eight bits wide, which corresponds to the number of variable speed channels 120' which can of course be set to high speed.

Shift registers 101 and 102 are additionally respectively associated with correspondingly dimensioned latches 105 and 106, effective for holding the output lines from latches 105 and 106 at a particular logic or voltage level even long after the register preceding the particular latch has changed state.

Individual high and low speed latch signals along respectively lines 410 and 411 apply the information in respective shift registers 101 and 102 onto corresponding latches 105 and 106.

The outputs of the respective latches 101 and 102 are presented to corresponding level shifters 131 and 131' which provide level translation to establish output signals according to ARINC 429 format. For any particular one of the level shifters 131 and 131' to be active, the high or low speed clock driving particular multiplexer must be set high.

After each thirty-two bit serial word of information has been transferred out along a particular one of output channels 120 or 120', a time gap is established to identify the end of one word of information and the beginning of the next. In order to determine the length of the gap between successive words and to determine when a gap should be inserted between any two words, a gap counter and a gap flag as suggested at block 510 of FIG. 5B are established. Whenever the program inspects the high speed gap flag and it is set, the gap count is incremented as will be shown.

Controller 23 repeatedly cycles through a similar pattern of operation under direction of counter 43 and keeps track of its operation by incrementing the step number at suitable intervals pursuant to the frequency of oscillator 55 operating through flip-flops 61' and 61' shown in FIG. 3. Oscillator 55 preferably produces an output frequency signal of 5.6 megahertz. (The divide by 8 results in 1.4 mhz or 0.714 microseconds per step.) Each cycle of controller 23 includes 4096 steps or equivalently 2.925 milliseconds.

Whenever the step number is a multiple of seven, five microsecond intervals, a check is conducted to see if the high speed clock has been set low, as suggested by blocks 511 and 512 in FIG. 5B. If the high speed clock has not already been set low, the high speed clock is toggled, thereby setting it low. If the high speed clock has been low, it is set high. This establishes the preferable operating frequency of the high speed clock at one-hundred kilohertz, which is effective for determining the rate at which a single bit of high speed data is applied to respective output channels 120'.

Whenever the high-speed bit-count equals the length of a serial output word i.e., 32, the high-speed gap-flag is set to cause the establishment of a gap period between words of transmitted information as suggested by blocks 524 and 525 in FIG. 5B.

As long as the word count remains at a level no more than eight, indicating that no more than eight high-speed words have been transmitted, the high speed shift flag is set and the high speed latch flag is reset as suggested at block 515. The stop flag is set whenever the word count exceeds eight as suggested at block 522. In any case, the step used flag is set to indicate the performance of a significant operation, as suggested by blocks 516 and 523 of FIG. 5B.

If the high speed gap flag is set, then the high speed gap count is incremented. Whenever the gap count equals 55, as suggested at block 531 of FIG. 5C, a new enable word is latched into place. If the gap count equals 56 as suggested by block 534, the high speed gap flag and the gap count are reset as indicated at block 535.

Figure 5D:
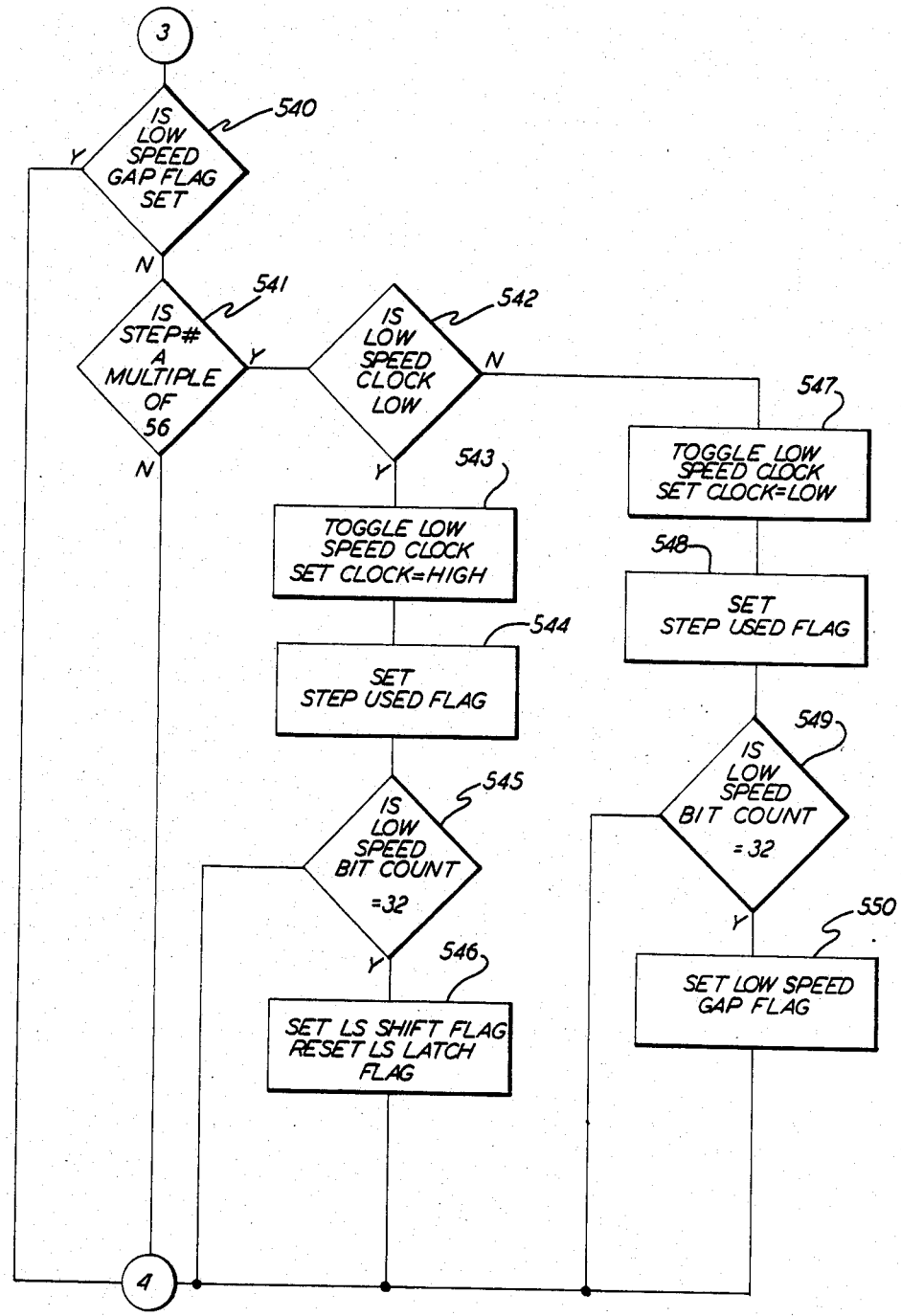

A check is also conducted to see whether the low speed gap flag has been set, as suggested at block 540 in FIG. 5D.

The low-speed clock is regularly toggled every 56 steps or 40 microsecond intervals as indicated in block 543 of FIG. 5D of the flowchart, to establish the characteristic frequency for a bit of low speed data being transferred, that is 12,250 KHZ. Further, if the low speed bit count is equal to 32, then the low speed gap flag is set, as suggested at blocks 549 and 550 of FIG. 5D.

Figure 5E:
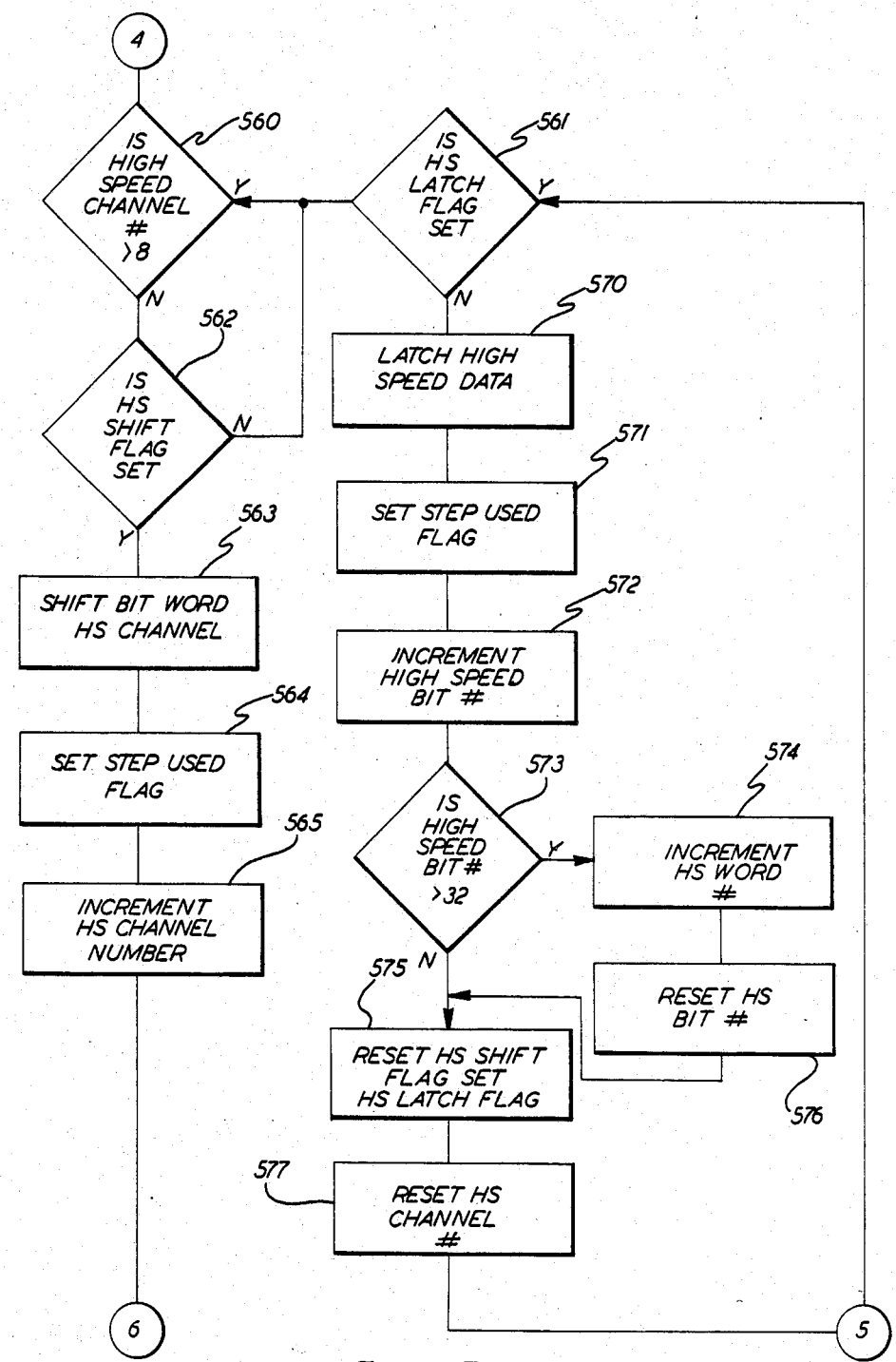

If the high speed channel number is over eight, as suggested at block 560 of FIG. 5E, indicating that a bit of information has been placed in output register 102 for each high-speed output channel; and if the high-speed latch-flag has not been set as suggested by blocks 561 and 562 of FIG. 5E, indicating that the data in the register has not already been latched to the output; then the available eight bits of high-speed data are latched out onto the eight corresponding output channels 120'; the step used flag is set; the high speed bit number is incremented; and a check is conducted to determine whether or not the high-speed bit-number exceeds 32, as respectively indicated at blocks 570, 571, 572 and 573.

If the high speed bit number exceeds 32, indicating that an entire high-speed word has been transmitted on each of the eight output high-speed channels, then the high speed word number is incremented, and the high speed bit number is reset as suggested at blocks 574 and 576 of FIG. 5E. Then, the high-speed shift flag is set; the high speed latch flag is set; and the high speed channel number is reset, as suggested at blocks 575 and 577.

If the high-speed channel number is not greater than eight, and the high speed shift flag is not set, as suggested at blocks 560 and 562; the high speed data is nonetheless latched to the data bus as suggested at block 570, and the sequence just described, including the setting of the step used flag (block 571) and incrementing the high speed bit number (block 572), is also performed, as already indicated.

If the number of the high-speed channel is not greater than eight and the high speed shift flag is not set as suggested at respective blocks 560 and 562, then a bit word is shifted into the high-speed channel, the step used flag is set and the high speed channel number is incremented as suggested at blocks 563, 564 and 565 of FIG. 5E.

Blocks 574 and 576 respectively provide for incrementing the high speed word number and resetting the bit-number. This is important, because eight high-speed words are transmitted for each low speed word.

Figure 5F:
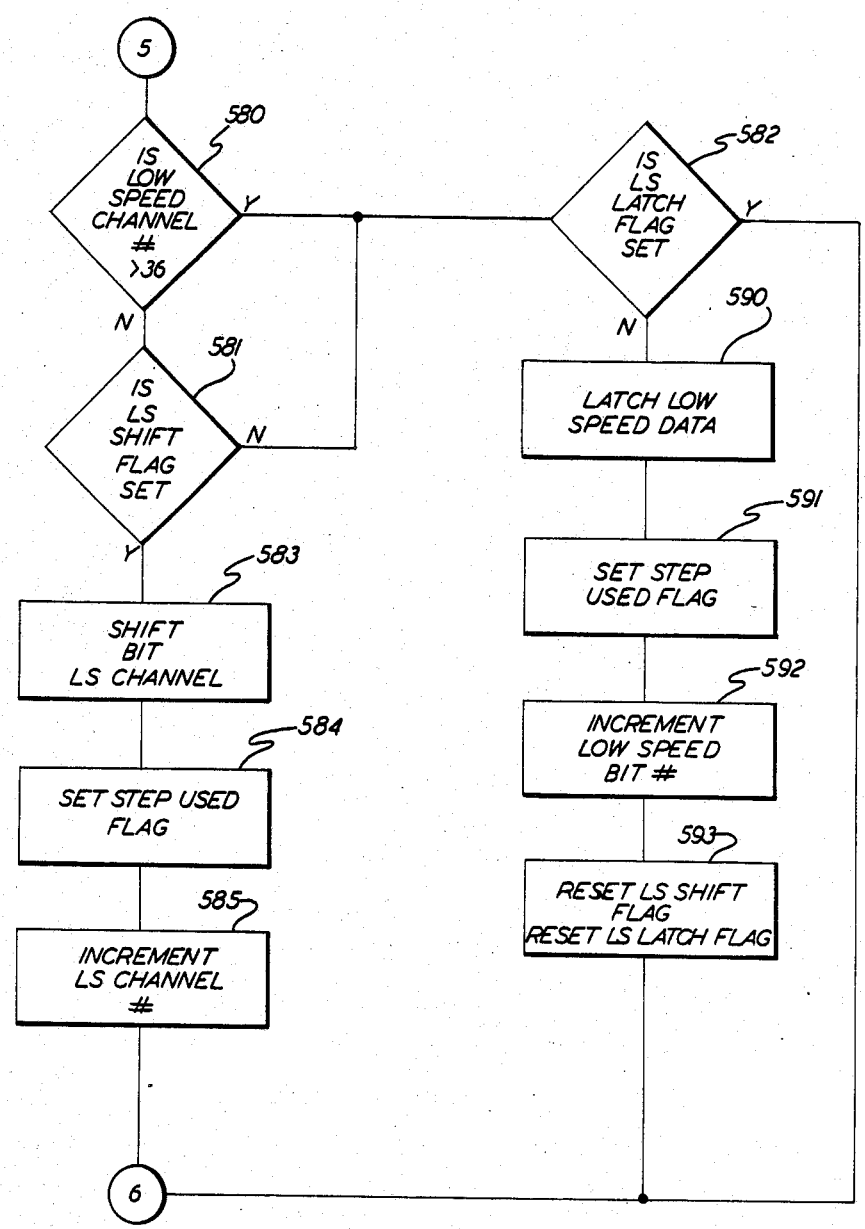

FIG. 5F shows the procedure for latching out low-speed data. If the low-speed channel number is less than 36, as suggested at block 580 and the low-speed shift-flag is set, as suggested at block 581; a bit of low speed information is transmitted along a low-speed channel; the step-used flag is incremented, and the low-speed channel number is incremented, as respectively suggested at blocks 583, 584 and 585 in FIG. 5F.

On the other hand, if the low-speed register is full of data for each of the thirty six low speed channels, as indicated by the low-speed channel number at block 580 being greater than 36; and if the low speed latch flag is not set; then the data in low-speed register 101 is shifted into corresponding latch 105 for each of the 36 channels, forwarding a single bit of a 32-bit output serial low-speed data word out for transmission along each of the 36 output low-speed channels, as suggested by block 591 in FIG. 5F. After this has been accomplished, the step used flag is reset, the low speed bit number is incremented, the low speed flag is reset and the low speed latch flag is set, as respectively suggested by blocks 591, 592 and 593.

The step-count is repeatedly incremented as shown at block 610 of FIG. 5H and operation of the cycle begins anew for over 4096 steps as indicated at block 611. If the stop-flag has been set as suggested at block 612, operation proceeds according to FIG. 5G.

As long as operation is still within its 4096 steps, and the step-used flag is not set as suggested at block 600, another word is loaded from interface 70 onto bus 85 for storage in memory 65.

Figure 5G:
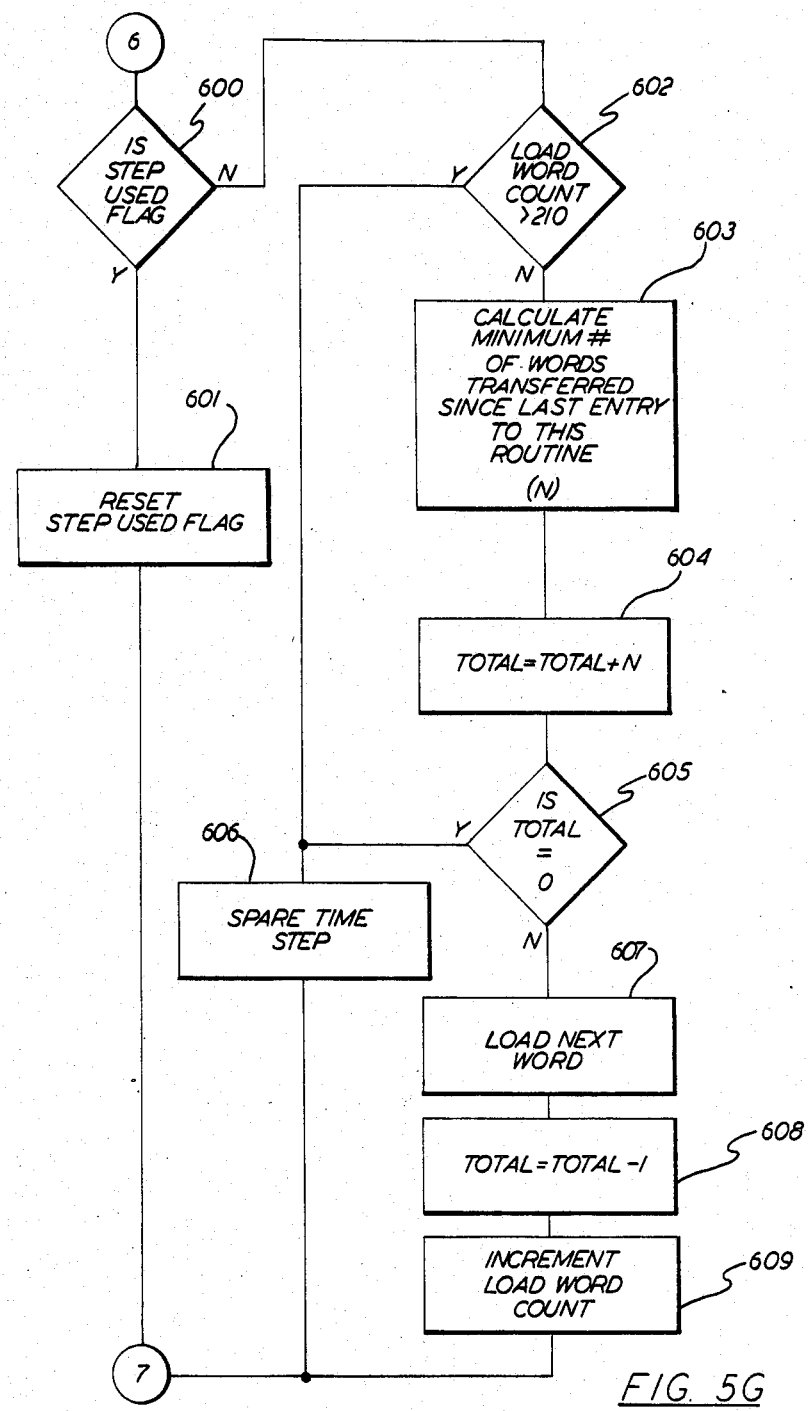

To insure that bus interface 70 has a word available, a calculation is performed as per block 603, which determines the number of words "N" transferred from interface 70 to memory 65 during the period of time elapsed since last passage through the routine of FIG. 5G. TOTAL signifies the amount of a running total of the minimum instantaneous number of words in interface 70, according to previous calculation. Accordingly, a predetermined TOTAL according to block 604 in FIG. 5G produces a present valid indication of the number of words available in interface 70 for transmittal to memory 65.

If there are no words available in interface 70, i.e., TOTAL = 0, as suggested at block 605, a spare time, do-nothing step is taken as indicated at block 606.

If there are in fact words available in interface 70 for transmittal, the next available word is loaded or written into memory 65. Then the indication of the number of words in interface 70, i.e. "TOTAL" is decremented with each word taken from interface 70 and entered into memory 65, as suggested at block 608. Of course, the load word count is incremented as suggested at block 609.

In this fashion, 32-bit words are serially output on variably high or low-speed parallel channels 120′ and low speed channels 120.

The above description is likely to induce one skilled in the art to conceive of additional embodiments of the invention. Accordingly, reference to the claims which follow is urged, as these specify with particularity the metes and bounds of the invention addressed herein.

We claim:

1. A method for producing words of information at a predetermined number of parallel output channels of a digital transmitter, each of the words being serially output at a selected one of said output channels, said method comprising the steps of:

receiving said information in parallel from an established data base for storage in a memory means for receiving said information;

carrying said information on a bus means for carrying said information to said memory means in order temporarily to hold said information for reapplication onto said bus means;

selecting corresponding bits of information from a plurality of words applied onto said bus means, with a multiplexer means for selecting bits of information from said bus means;

applying a predetermined number of said words onto said bus means to permit the selection of corresponding bits of said words by said multiplexer means with a controller means for controlling the operation of said digital transmitter;

receiving said predetermined number of corresponding bits of information from said multiplexer means for producing said corresponding bits of said words for serial output at said parallel channels with a shift means for receiving said bits of information; and repeatedly receiving said corresponding bits of words from said shift means and latching them with respect to respective ones of said output channels, until each of the bits in each of said words has been produced at one of said output channels.

* * * * *